United States Patent [19]

Shiraishi

[11] Patent Number: 4,734,715

[45] Date of Patent: Mar. 29, 1988

[54] VARIABLE LIGHT BEAM SCANNING APPARATUS

[75] Inventor: Takashi Shiraishi, Yokohama, Japan

[73] Assignee: Kabushiki Kaisha Toshiba, Kanagawa, Japan

[21] Appl. No.: 863,172

[22] Filed: May 14, 1986

[30] Foreign Application Priority Data

May 31, 1985 [JP] Japan ................... 60-119074

[51] Int. Cl.$^4$ .............................................. G01D 9/42
[52] U.S. Cl. ...................................... 346/108; 358/296
[58] Field of Search .................. 346/108, 107 R, 76 L, 346/160; 358/296

[56] References Cited

U.S. PATENT DOCUMENTS

| | | | |
|---|---|---|---|
| 3,541,245 | 11/1970 | Orthuber | 178/7.3 |
| 4,198,154 | 4/1980 | Masegi | 346/146 |
| 4,434,431 | 2/1984 | Ohkubo et al. | 346/108 |
| 4,539,478 | 9/1985 | Sano | 346/108 |
| 4,578,689 | 3/1986 | Spencer | 346/108 |
| 4,642,701 | 2/1987 | Maeda | 346/108 |

FOREIGN PATENT DOCUMENTS 1193367 5/1965 Fed. Rep. of Germany .

Primary Examiner—E. A. Goldberg
Assistant Examiner—Mark Reinhart
Attorney, Agent, or Firm—Oblon, Fisher, Spivak, McClelland & Maier

[57] ABSTRACT

A light beam scanning apparatus in which light beams are modulated by image information signals and the modulated light beams are directed onto a photosensitive body consists of a light source which produces light beams, a first scanning unit which causes the light beams produced by the light source to scan in a first direction with respect to a photosensitive body, a second scanning unit which causes the light beams produced by the light source to scan in a second direction that is normal to the first direction, an image formation means by which an image constituted by continuous or discontinuous dots is formed on the photosensitive body following scanning in the first and second directions and a speed control means which controls the speed of light beam scanning brought about by the first scanning unit in a manner such that the density of dots successively formed in the second direction is made variable.

5 Claims, 12 Drawing Figures

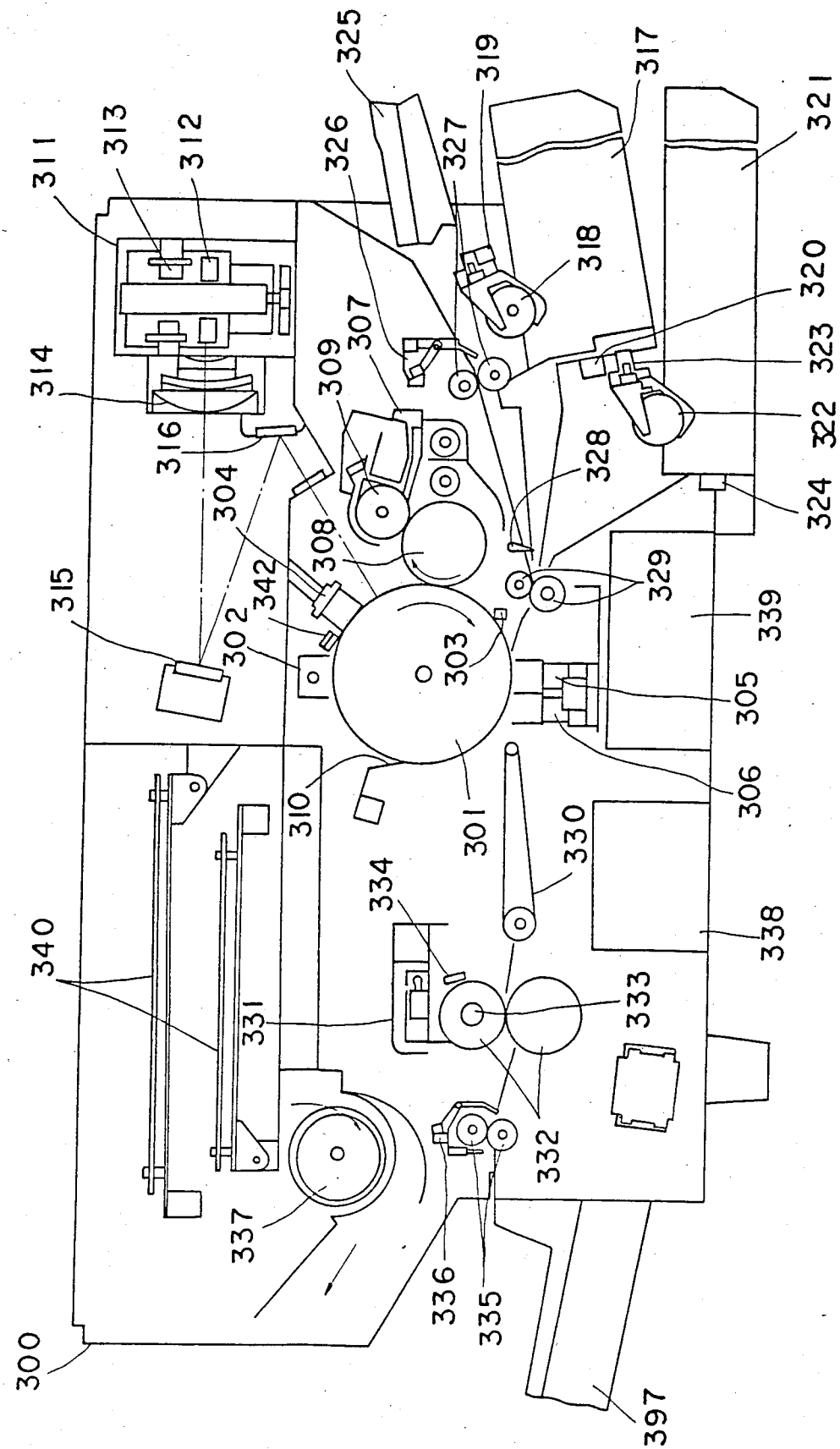

VARIABLE LIGHT BEAM SCANNING APPARATUS

BACKGROUND OF THE INVENTION

1. Field of the Invention

The present invention relates to a light beam scanning apparatus wherein a light beam from a semiconductor laser or similar light source is modulated by image information signals and an image is formed by scanning a photosensitive body with the resulting light beam.

2. Discussion of Background

Image resolution is varied in a number of ways in conventional laser printers incorporating light beam scanning apparatus. With prior art methods, however, the laser printer's resolution is fixed at a certain value on shipment from the factory and it is not possible for the general user to alter or adjust this resolution, as he sees fit, This has meant that there has caused the problem that, for example when varying degrees of resolution are needed that, complex data signal processing is necessary, in order to effect image formation by laser beams on the basis of data from an information reading apparatus.

SUMMARY OF THE INVENTION

The present invention has been devised in view of the above situation and has as one of its object to provide a light beam scanning apparatus in which the image resolution can be easily altered by the user without requiring a change in hardware.

It is a further object of the invention to provide a light beam scanning apparatus in which the dot density in the light beam's subsidiary scanning direction, which is an essential aspect of alteration of the resolution, of the apparatus can be changed.

It is yet another object of the invention to provide a light beam scanning apparatus which permits alteration of the dot density in the light beam's principal scanning direction.

The light beam scanning apparatus for achieving the above objects consists of a light source which produces light beams, a first scanning unit which causes the light beams produced by the light source to scan in a first direction with respect to a photosensitive body, a second scanning unit which causes the light beams produced by the light source to scan in a second direction that is normal to the first direction, an image formation means by which an image constituted by either continuous or discontinuous dots is formed on the photosensitive body following scanning in the first and second directions and a speed control means which controls the speed of light beam scanning brought about by the first scanning unit in a manner such that the density of dots successively formed in the second direction is made variable.

BRIEF DESCRIPTION OF THE DRAWINGS

FIG. 2 is schematic cross-section showing an example of use of the light beam scanning apparatus of the invention in a laser printer;

DETAILED DESCRIPTION OF A PREFERRED EMBODIMENT

A description will now be given with reference to an embodiment applying the invention that is shown the drawings.

Figure 1:
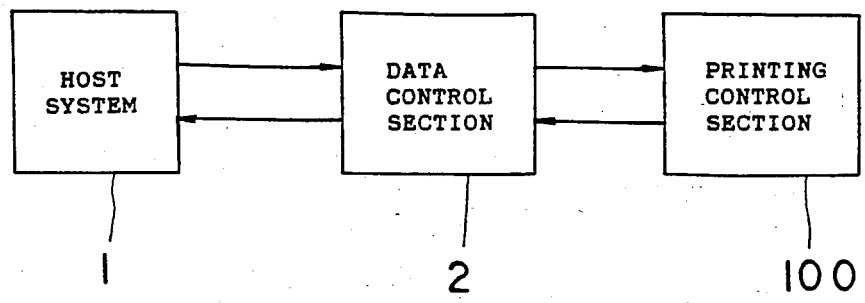
FIG. 1 is a system block diagram showing the relations between the light beam scanning apparatus of the invention and external units.

FIG. 1 is a block diagram of a system for recording information on a recording medium by means of a laser beam. Information from a host system (electronic computer or word processor main unit, etc.) that supplies information is supplied to a data control section 2, where the information supplied from host system 1 is converted to dot-correspondence data and stored in a page memory. This dot-image data is sent to a printing control section 100, where a laser beam is modulated by the input dot-image data, the modulated laser beam is caused to scan a photosensitive body to form an image constituted by dots, this image is developed and the developed image is transferred onto recording paper.

Figure 3:
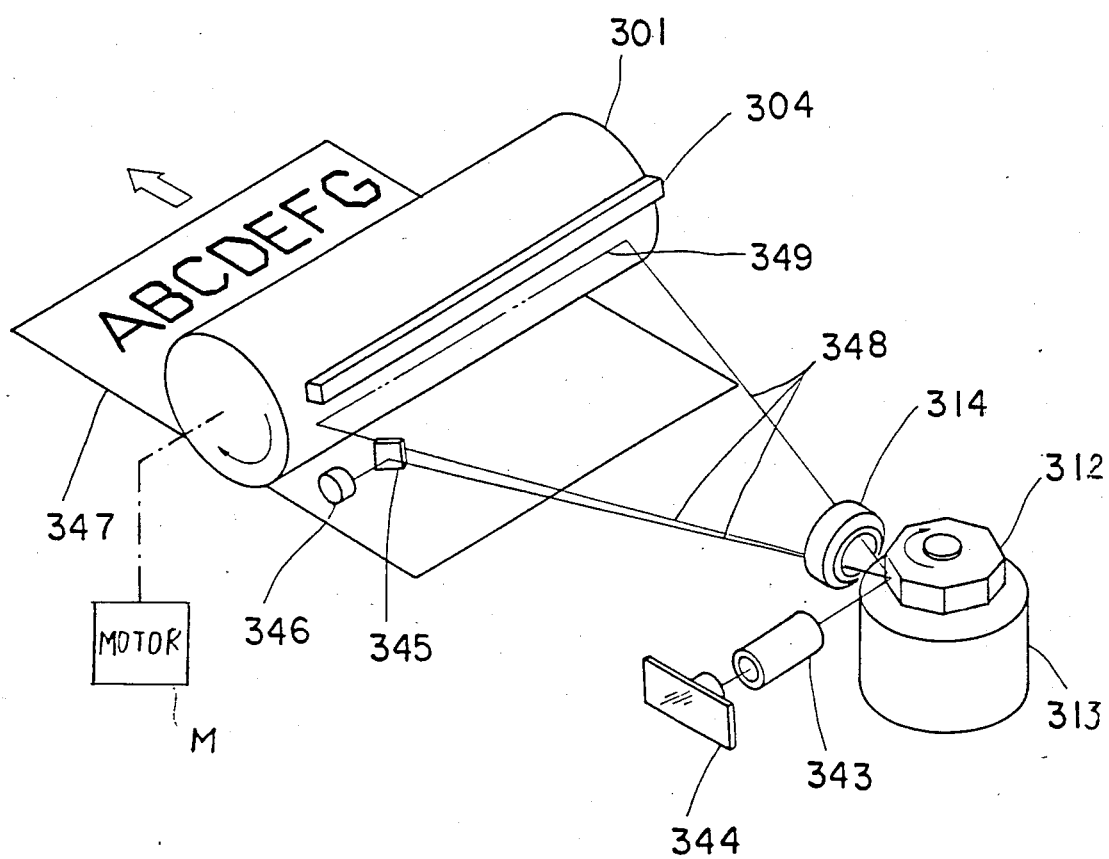
FIG. 3 is a schematic perspective view showing the relation between the scanning unit of the laser printer shown in FIG. 2 and a photosensitive body.

FIG. 2 shows details of the structure of a laser printer possessing a video interfare. Printing control section 100 of FIG. 1 is contained in a printer main body 300. In a central portion of printer main body 300, there is a photosensitive drum 301 which can form an image consisting of dots as a result of being scanned by a laser beam and which is rotated at high speed by a motor M as shown in FIG. 3. A charge removal lamp 302 for effecting removal of charge from photosensitive drum 301 in the initial state is disposed at an upper portion of the periphery of photosensitive drum 301. The charge removal lamp 302 consists of a plurality of red LEDs. There is also a charge removal lamp 303, similarly constituted by a plurality of red LEDs, that is provided at a lower right-hand portion of the periphery of photosensitive drum 301 to improve the efficiency of transfer onto copy paper of toner images that have been developed on the photosensitive drum 301. At an upper right-hand portion of the periphery of photosensitive drum 301, there is a main charger 304 for uniformly charging the photosensitive drum 301 to a set potential. At a lower portion of the periphery of photosensitive drum 301, there is a transfer charger 305 for effecting transfer of a toner image developed on photosensitive drum 301 onto copy paper and a peel-off charger 306 for effecting the separation of the copy paper from photosensitive drum 301 following the transfer of an image. To the right of the periphery of photosensitive drum 301, there is provided a developing unit 307 for developing an electrostatic latent image that has been formed as the result of scanning of photosensitive drum 301 by a laser beam. Developing unit 307 comprises a magnet roller 308 which causes a toner to adhere to an electrostatic latent image on photosensitive drum 301. Adjacent to the magnet roller 308, there is provided a probe 309 which contacts the developer that adhers to the magnet roller 308 and which serves to measure the toner specific density of the developer. At the left-hand side of the periphery of photosensitive drum 301, there is provided a blade 310 forremoving excessive toner that remains on photosensitive drum 301 after transfer of a toner image onto copy paper that has placed in contact with photosensitive drum 301.

A laser scanning unit 311 is provided in the upper right-hand portion of main body 300. Unit 311 is the unit which modulates a laser beam with image information signals input from the data control section and effects the scanning of photosensitive drum 301 to form the electrostatic latent image and it consists of an octahedral polygon mirror 312 by which a laser beam produced by a laser diode constituting a light source is led onto photosensitive drum 301. A motor 313 is coupled to the polygon mirror 132 and serves to rotate it at high speed. An f.$\theta$ lens is provided in order to make the speed of laser beam scanning on photosensitive drum 301 constant. There are also reflecting mirrors 315 and 316 which are disposed in a manner such that light exiting from f·$\theta$ lens 314 is led onto photosensitive drum 301.

An upper-stage cassette 317 able to hold 500 sheets of copy paper and a lower-stage cassette 321 able to hold 250 sheets of copy paper are detachably installed in a lower right-hand portion of main body 300. A paper feed roller 318 which contacts paper accommodated in cassette 317 and serves to take out this paper is provided in correspondence with the upper-stage cassette 317. Adjacent in the paper feed roller 318, there is provided a paper run-out detector 319 which detects when paper in the upper-stage cassette 317 has run out. An upper-stage cassette size detector 320 for detecting the cassette type, which represents the size of accommodated paper, is provided in a position facing the front edge of upper-stage cassette 317. The lower-stage cassette 321 is similarly provided with a paper feed roller 322, paper run-out detector 323 and a lower-stage cassette size detector 324. Above the upper-stage cassette 317, there is a manual insertion guide 325 to permit copy paper to be inserted by hand. A manually-inserted paper supply switch 326 by which inserted paper is detected is provided forward of this guide 325. A paper feed roller 328 for manual insertion is provided forward of switch 326, and the actuator 328 of a manual stop switch that detects paper that has been forwarded by paper feed roller 327 is provided forward of paper feed roller 327.

Adjacent to the photosensitive drum 301, there are position-adjustment rollers 329 for synchronizing the front edge of the paper that has been taken from the upper-stage cassette 317, the lower-stage cassette 321 or from the manual insertion guide 325 with a toner image that has been developed on the photosensitive drum 310. A toner image is transferred from photosensitive drum 301 onto the copy paper by the action of transfer charger 305, then the paper is separated from drum 301 by the action of the peel-off charger 306. A forwarding belt 330 for forwarding the separated paper is provided to the lower left of drum 301. Following on from an end portion of forwarding belt 330, there is the fixing unit 331, and a toner image on copy paper that has been forwarded by forwarding belt 330 is fixed by way of heating. The fixing unit 331 consists of fixing rollers 332 with a heater lamp 333 inside and a thermistor 334 for detecting the surface temperature of the fixing roller 332. After fixing unit 331, in a left-hand portion of the interior of main body 300, there are paper feed-out rollers 335 and a paper feed-out switch 336 which detects paper that has been fed out. A delivery tray 397 which receives paper that has been fed out by paper feed-out rollers 335 is mounted on the exterior of main body 300, on its left-hand side.

A cooling fan 337 for cooling the interior of main body 300 is provided in an uppr left-hand portion inside the main body 300, and a high voltage transformer 338 and power supply unit 339 are provided in a bottom portion inside the main body 300. A high voltage transformer 338 produces a high voltage that is supplied to chargers 304, 305 and 306 and to the developing unit 307. A power supply unit 339 produces DC voltage for control purposes. A PC board unit 340 for controlling the functions of the main body 300's operation is provided inside the main body 300 is an upper left-hand portion thereof.

Photosensitive drum 301 is provided with a temperature sensor 342 installed adjacent to the drum and serves to detect the drums temperature. A thermistor with a very small thermal resistance is used for this sensor 342.

FIG. 3 is a perspective view showing the outline of parts for formation of an image on photosensitive drum 301 through laser beam scanning. In FIG. 3, laser beams coming from a semiconductor laser 344 are corrected to parallel light by a collimator lens 343 and this parallel light strikes one of the eight surfaces of the polygon mirror 312, which is rotated at high speed in the direction of the arrow by scanning motor 313. Laser beams that have struck the polygon mirror 312 are passed through f. $\theta$ Lens 314 and caused to scan a scanning range 348 from left to right (the principal scanning direction). One portion of the laser beams in beam scanning range 348 is directed to a beam detector 346 by a reflecting mirror 345, whereby laser beams that are being caused to effect scanning are detected once in each horizontal scan, off one surface of polygon mirror 312. Laser beams inside the beam scanning range 348 that do not strike the reflecting mirror 345 are radiated onto photosensitive drum 301. The portion of photosensitive drum 301 scanned by laser beams is indicated by a two-dot chain line in FIG. 3. Where reference 304 indicates an electrifying charger and reference 346 the copy paper. As shown in FIG. 2, in an actual printer, laser beams that have passed through f·$\theta$ lens 314 are not radiated directly onto photosensitive drum 301 but are led to photosensitive drum 301 by being reflected by reflecting mirrors 315 and 316. For convenience, FIG. 3 does not show these reflecting mirrors 315 and 316 but shows things as if laser beams that have passed through f·$\theta$ lens 314 are radiated directly onto photosensitive drum 301.

Figure 4:
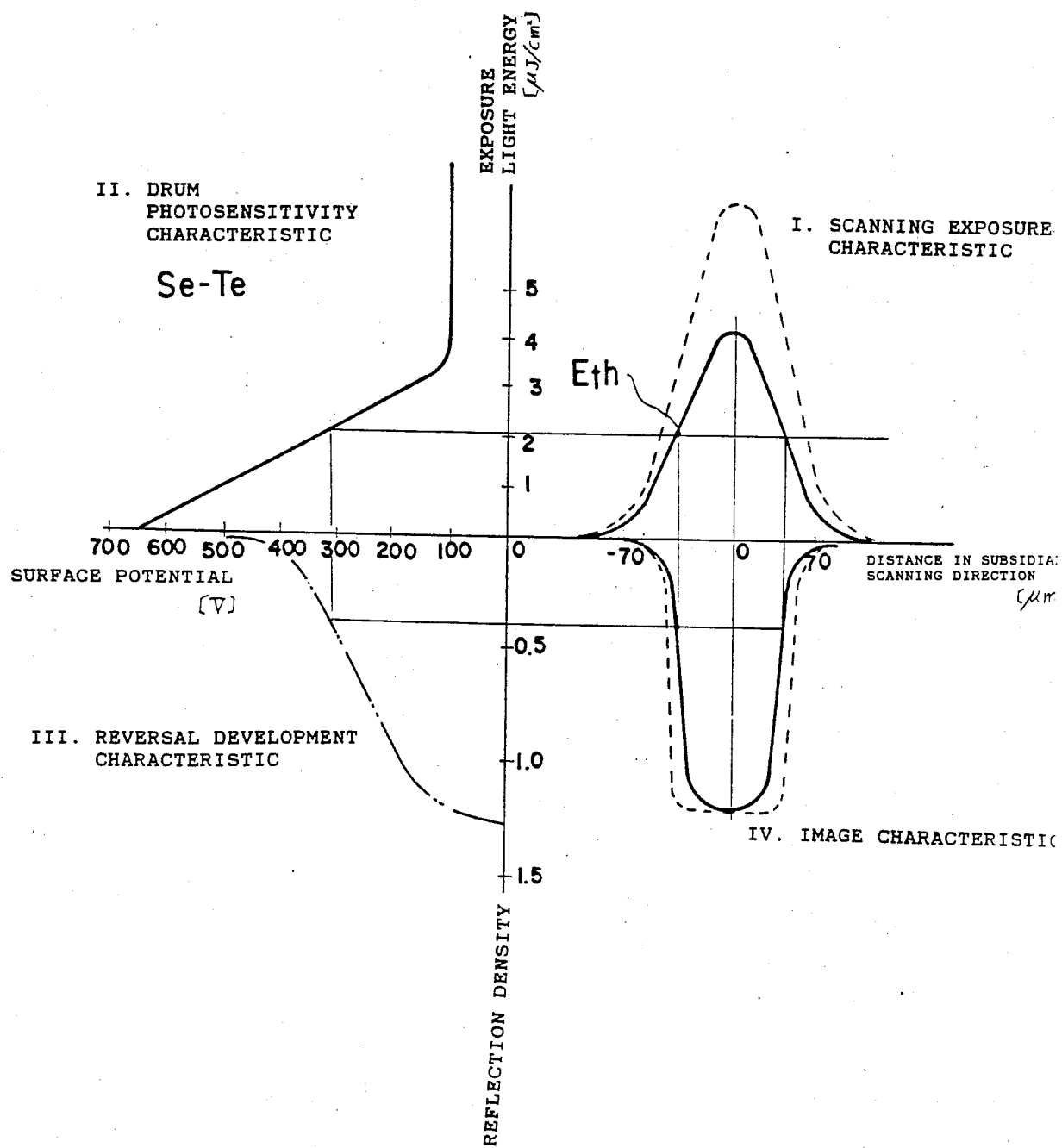
FIG. 4 is a characteristic plot showing the relation between a laser beam's intensity distribution and image characteristics.

The relation between the intensity distribution of laser beams scanning photosensitive drum 301 and image characteristics will now be described with reference to FIG. 4. In FIG. 4, I is the spatial distribution on photosensitive drum 301 of scanning exposure energy resulting from scanning of photosensitive drum 301 by laser beams from a semiconductor laser in which the light energy distribution takes the form of a normal distribution, II is the photosensitivity characteristic of photosensitive drum 301, III is the reversal development characteristic (including the effects of transfer and fixing) and IV indicates the image characteristics. Image characteristics IV is obtained by superposition of photosensitivity characteristic II and reversal development characteristic III on spatial distribution I of scanning exposure light.

The scanning exposure characteristic indicated by a full line in the drawing is a characteristic simulated for a laser output of 5 mW, while the scanning exposure characteristic indicated by a dashed line is a characteristic simulated for a laser output of 8 mW. Comparing the image characteristics corresponding to these scanning exposure characteristics, one sees that the larger laser output results in a thicker line. (The abscissa of the image characteristic represents the distance in the subsidiary scanning direction normal to the main scanning direction).

In other words, if one effects variable control of the laser power of laser beams, one can vary the thickness of lines and the size of points (dots).

Next, the relation between laser power and pitch in the subsidiary scanning direction will be considered.

Figure 5:
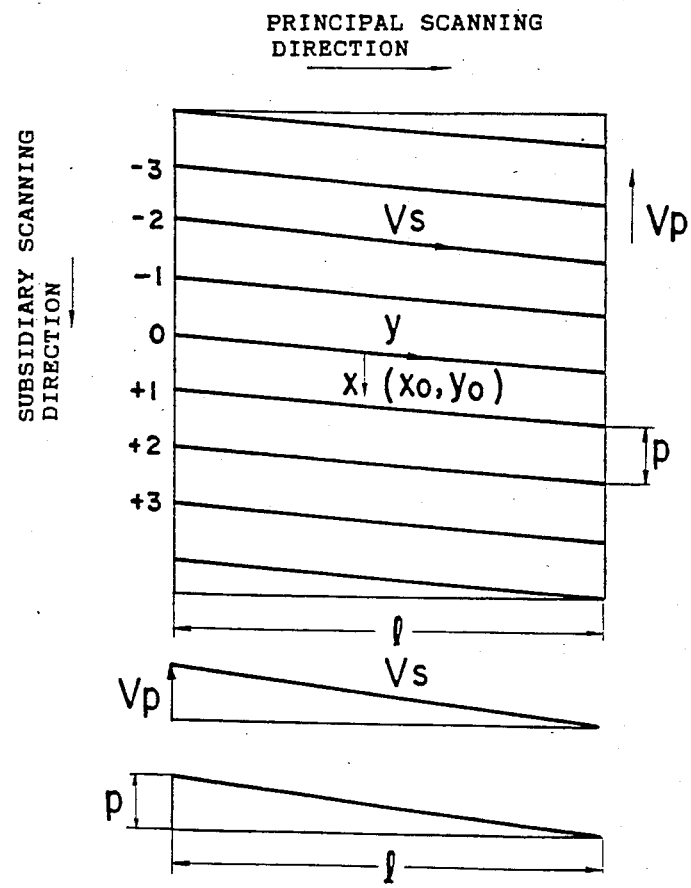
FIG. 5 is a schematic view showing laser beam scanning action in main and subsidiary scanning directions.

On continuous scanning by a laser beam from left to right as shown in FIG. 5, laser beam intensity I is approximately $$I = \eta_{opt} I_o \cdot \exp(-\alpha^2 X^2 - \beta^2 Y^2) \quad (1)$$

where,
$\eta opt$: scanning system's total optical coefficient
$I_o$: maximum laser intensity
$\alpha, \beta$: Gaussian coefficients
X: subsidiary scanning direction coordinate
Y: principal scanning direction coordinate
The laser beam power Pl at this time is $$Pl = \int_{-\infty}^{\infty} \int_{-\infty}^{\infty} I_o \cdot \exp(-\alpha^2 X^2 - \beta^2 Y^2) dx dy = I_o \pi / \alpha \beta \quad (2)$$

Designating principal scanning direction speed as Vs, subsidiary scanning direction speed as Vp and the scanning pitch is P then $$VS = Vp \cdot l / P \quad (3)$$

The energy density to which the photosensitive drum is exposed is the sum of the energy produced in the various scans and the energy at the nth scan is $$En(Xo, Yo) = \eta_{opt} I_o \cdot \quad (4)$$

$$\exp\{-\alpha^2 (Xo - nP)^2\} \cdot \int_{Yo}^{Yo - l} \exp(-\beta^2 Y^2) dt$$

Since, as a practical question, Yo and l are substantially greater than the laser spot diameter, the range of Eq. (4) can be replaced by $\pm \infty$.

Designating laser power as Pl, the total amount of exposure light resulting from all scans is $$E(Xo) = Pl \cdot \alpha \cdot P \cdot \eta_{opt} \times \{1/(\sqrt{\pi} \cdot l \cdot Vp)\} \cdot Sn(Xo - nP) \quad (5)$$

where $$Sn = (\beta) = \sum_{n=-\infty}^{\infty} \exp(-\alpha^2 \beta^2) \quad (6)$$

The extreme case here is when the maximum value of the amount of exposure light is X=nP and the minimum amount of exposure light is $X=P(n-\frac{1}{2})$, this minimum value of exposure light being $$E(p/2) = Pl \cdot \alpha \cdot P \cdot \eta_{opt} \times \{1/(\sqrt{\pi} \cdot l \cdot Vp)\} \cdot Sn\{(n - \frac{1}{2})P\} \quad (7)$$

What is used in practice in image output apparatus are the ranges $\alpha P \leq 2.0$ and $\beta \leq 2.0$, and this can be approximated as follows.

$$E(p/2) \approx Pl \cdot \theta_{opt}/(l \cdot Vp) \quad (8)$$

Eth is taken to be the exposure energy correponding to the location where the boundary between black and white appears in the image of FIG. 4. When E(P/2)=Eth, the minimum laser power Pmin at this time is given by Eq. (8).

$$Pmin = Eth \cdot l \cdot Vp / \eta_{opt} \quad (9)$$

Use of this definition of Pmin permits Eq. (5) representing the total amount of exposure of the surface of a uniformly scanned photosensitive body to be normalized as follows.

$$(E(X)/Eth) = \alpha P / \sqrt{\pi} \cdot (Pl/Pmin) \cdot Sn(X - nP) \quad (10)$$

There now follows a discussion of the relation between laser power and printed characters in different situations. In a situation with a 1,1 1-dot line in the principal scanning direction (White with normal development, black lines with reversal development) would be the case where n=0 in Eq. (10), the places where $$\{\alpha P / \sqrt{\pi} (Pl/Pmin)\} \cdot \exp\{-(\alpha P/2)^2\} = 1 \quad (11)$$

would constitute the boundary between black and white.

In a situation with a 1,2 1-dot line in the principal scanning direction (Black with normal development, white lines with reversal development)

One would simply need to subtract the equivalent of 1 scanning line from the total scanned location. The places where $$\{\alpha P / \sqrt{\pi} (Pl/Pmin)\} \cdot [Sn\{P \cdot (2n + 1)/2\} - \exp\{-(\alpha P/2)^2\}] = 1 \quad (12)$$

would constitute the boundary between black and white.

By a similar approach, one can determine the boundary between black and white by the following formulas. In a situation with 2,1 1-dot line in subsidiary scanning direction (Black with normal development, white lines with reversal development)

The width P on a scanning line is $$\{\alpha P/\sqrt{\pi} \ (Pl/P\text{min})\} \cdot Sn(nP)[1 - 1/\sqrt{\pi} \ Sk'(P)] = 1 \tag{13}$$

and the width P between scanning lines is $$\{\alpha P/\sqrt{\pi} \ (Pl/P\text{min})\} \cdot Sn([n - \tfrac{1}{2}]P) \cdot [1 - 1/\sqrt{\pi} \ Sk'(P)] = 1 \tag{14}$$

where $$S'(\delta) = \sum_{k=1}^{\infty} (-1)^{k+1}(\beta\delta)^{2k-1}/(2k - 1)(k - 1)!$$

with a 2,2 1-dot line in the subsidiary scanning direction (white with normal development, black lines with reversal development) the width P on a scanning line is $$\{\alpha P/\pi \ (Pl/P\text{min})\} \cdot SN[(n - \tfrac{1}{2})P] \cdot Sk'(P) = 1 \tag{15}$$

and the width P between scanning lines is $$\{\alpha P/\pi \ (Pl/P\text{min})\} \cdot Sn(nP) \cdot Sk'(P) = 1 \tag{16}$$

In a situation of a 3,1 1-dot (White with normal development, black lines with reversal development)

$$\{\alpha P/\pi \ (Pl/P\text{min})\} \cdot Sk'(P) = 1 \tag{17}$$

the width P on a scanning line $$\{2\alpha P/\pi \ (Pl/P\text{min})\} \cdot \exp[-(\alpha p/2)^2] \cdot Sk'(P/2) = 1 \tag{18}$$

In a situation of a 3,2 1-dot (Black with normal development, white lines with reversal development) the width P on a scanning line is $$\{\alpha P/\pi(Pl/P\text{min})\} \cdot [\sqrt{\pi} \ Sn(nP) - Sk'(P)] = 1 \tag{19}$$

and the width P between scanning lines is $$\{\alpha P/\pi(Pl/P\text{min})\} \cdot [\sqrt{\pi} \ Sn([n - \tfrac{1}{2}]P) - 2 \cdot \exp\{-(\alpha P/2)^2\} \cdot Sk'(P/2)] = y \tag{20}$$

It is seen in Eqs. (11)–(20) above that the optimum pitch P for giving the clearest image can be changed by changing the laser beam power Pl (since $\alpha, \sqrt{\pi}$ and Pmin are constants). from Eq. (3) above, the pitch P can be changed by varying the laser beam's principal scanning speed Vs or the speed Vp in the subsidiary scanning direction.

Use of the above facts made the following clear:

(1) that dot diameter can be varied by varying the lower power Pl, and changing the dot diameter results in a change in the thickness of the lines appearing as an image.

(2) If the speed Vp in the subsidiary scanning direction (rotational speed of photosensitive drum 301) is made constant, the pitch P can be changed by changing the speed Vs in the principal scanning direction. Hence, one can change pitch P by varying the speed of rotation of polygon mirror 313. That is, the dot density in the direction of subsidiary scanning can varied, and it is greater as the rotational speed of polygon mirror 313 is higher and smaller as this rotational speed is lower. In contrast, the dot density in the principal scanning direction becomes smaller as the rotational speed of polygon mirror 313 is made faster and larger as the rotational speed of polygon mirror 313 is made slower. However, the dot density in the principal scanning direction can be adjusted independently of the rotational speed by varying the image signal frequency. More specifically, increasing the image signal frequency results in a greater dot density and making the frequency lower results in a smaller dot density.

From (1) and (2) above, it is possible to vary the image resolution. When the resolution is increased, i.e., when the dot density is increased, it is preferable to make the dot diameter correspondingly smaller. Conversely, when the resolution is reduced, i.e., when the dot density is made smaller, the dot diameter must be made larger. Variation of resolution in the principal scanning direction can be effected by changing the dot diameter and the image signal frequency, and variation of resolution in the subsidiary scanning direction can be effected by varying the dot diameter and the speed Vs in the principal scanning direction. Variation of the resolution in the principal and subsidiary scanning directions can be dealt with by varying the dot diameter, the image signal frequency and the speed Vs in the principal scanning direction.

Figure 6:
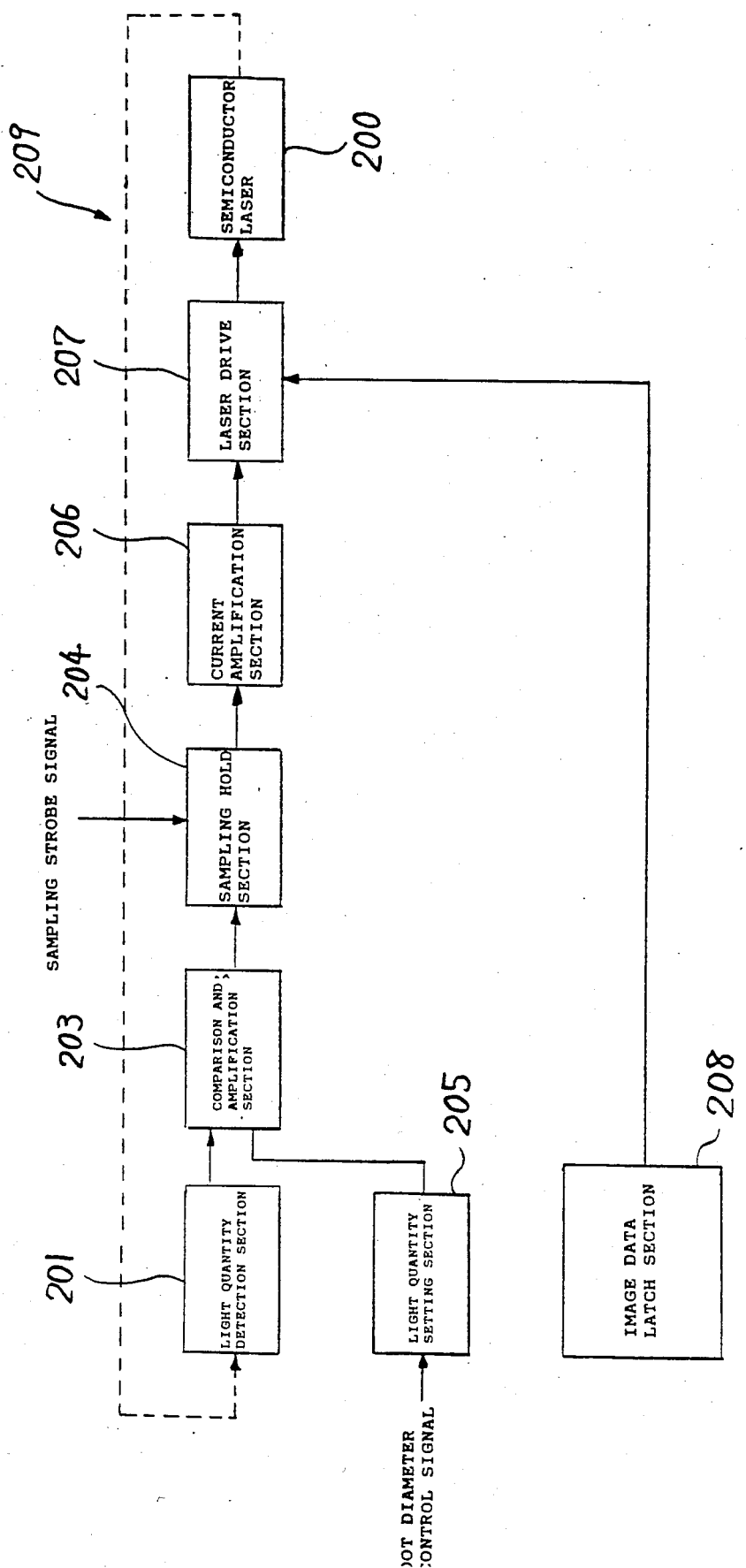
FIG. 6 is a block diagram of a light control unit in the light beam scanning apparatus of the invention.

As laser power control unit 209 constituting a light source lighting control unit for effecting variable control of laser beam dot diameter will now be described with reference to FIG. 6. Laser power control unit 209 effects the variable control of laser power through the current that flows in a semiconductor laser 200. There is provided a light detection section 201 which monitors the strength of the output beam of semiconductor laser 200 by means of a photodiode, etc. and outputs a voltage that is in proportion to this output beam strength. A light quantity setting section 205 permits the setting of a voltage that is at least sufficient to give solid black when a dot diameter control signal described below corresponds to a maximum diameter. A divided voltage is outputed on the basis of dot diameter control signals, taking this minimum sufficient voltage as a reference. A comparison and amplification section 203 compares the voltage from light detection section 201 and the voltage from light quantity setting section 205 and outputs an analog level voltage corresponding to the voltage from light quantity setting section 205. This output serves to stabilize the amount of light of semiconductor laser 200 at a set value. The output voltage of comparison and amplification section 203 is input to a sampling and hold section 204, where it is stored in a holding capacitor (not shown) when sampling and hold section 204 receives the input of a sampling hold signal. When the sampling hold signal is turned off (hold), the stored voltage is continuously output at the output of the sampling and hold section. A current amplification section 206 amplifies current in proportion to the output voltage of sampling and hold section 204. A laser drive section 207 drives the semiconductor laser 200 on the basis of data from an image data latch section 208 and in accordance with the level of analog level signals output by current amplification section 206. Thus, light quantity setting section 205 sets different voltages by dividing a reference voltage in response to dot diameter control signals, making it possible to vary the current flowing in semiconductor laser 200. The laser power of the laser beam emitted by semiconductor laser 200 is therefore varied, hence making it possible to vary the thickness of lines that appear as an image. As it is thus possible to change the thickness of lines by changing the actual dot diameter itself, there is no need to change the capacity of the image memory as has been the case in the past.

There now follows a description of a means for changing the speed Vs in the principal scanning direction in order to change the dot density in the subsidiary scanning direction.

Figure 7:
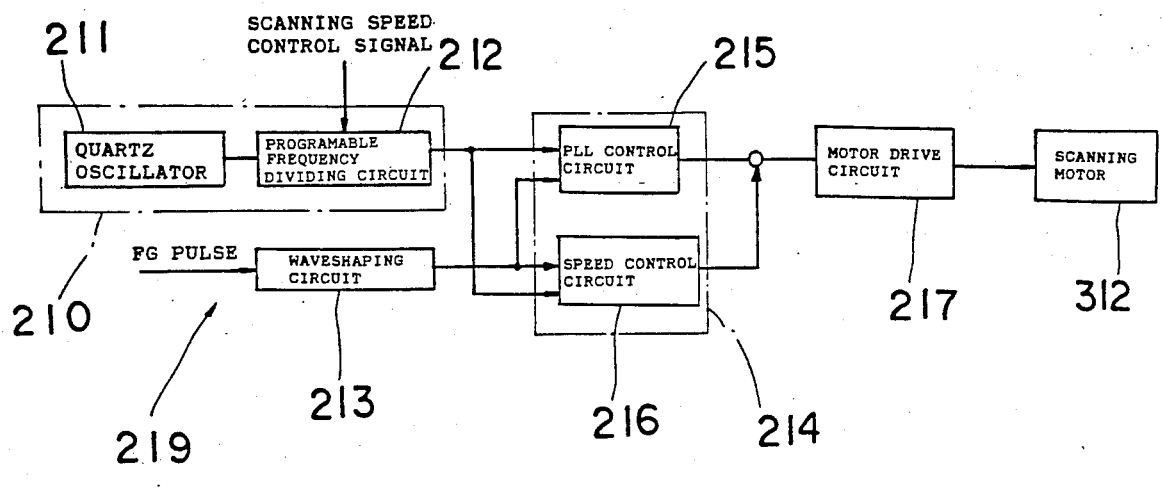
FIG. 7 is a block diagram of a scanning speed control unit for controlling scanning speed in the main scanning direction.

The speed Vs in the principal scanning direction can be dealt with by varying the rotational speed of polygon mirror 313. FIG. 7 is a block diagram of a scanning speed control unit 219, which is a unit for drive control of scanning motor 312 that drives polygon mirror 313. Referring to FIG. 7, in this embodiment, PLL (Phase-Locked Loop) control of scanning motor 312 is effected by an IC 214. A reference frequency generation circuit 210 connected to PLL control IC 214 consists of a quartz oscillator 211 and a programmable frequency dividing circuit 212 by which the oscillation output of quartz oscillator 212 is divided at a set frequency division ratio. The frequency division ratio for frequency dividing circuit 212 is set by the scanning speed control signals. The input of the laser beams horizontal synchronization signals are also fed to the programmable frequency dividing circuit 212 at a set input terminal not shown, so as to effect horizontal synchronization. A waveshaping circuit 213 effects waveshaping, and then the output, of frequency of an FG (Frequency Generator) of the scanning motor 312. PLL control IC 214 consists of PLL control circuit 215 and a speed control circuit 216. PLL control circuit 215 outputs a voltage that is proportional to the phase difference between the abovenoted reference frequency and the frequency of the FG pulses, while the speed control circuit 216 outputs a voltage that is proportional to the frequency difference of the reference frequency and the FG pulses. The outputs both of PLL control circuit 215 and of the speed control circuit 216 are fixed at a high level when the FG pulses are below the lock range and are fixed at a low level when the FG pulses are above the lock range. When the FG pulses are within the lock range, the output from PLL control circuit 215 is proportional to the phase difference and the output from speed control circuit 216 is proportional to the frequency difference and these outputs are added in a set proportion. A differential amplification circuit (not shown) controls and effects the pulse width modulation of the potential difference. A motor drive circuit 217 imposes a DC voltage corresponding to this pulse width modulation on the coil of scanning motor 312, thereby effecting drive control of scanning motor 312.

Thus, the rotational speed of scanning motor 312 can be changed through setting of the frequency division ratio in programmable frequency dividing circuit 212 by scanning speed control signals and changing of the reference frequency. As a result, the laser beam's principal scanning speed Vs is changed and, as described above, and the pitch P as shown in FIG. 5 is changed, thereby changing the dot density in the subsidiary scanning direction, and it is thus made possible to effect variation of resolution in the subsidiary scanning direction also. The variation of the dot density in the subsidiary scanning direction also makes it possible to vary the magnification of the image (the magnification relating to the subsidiary scanning direction) with control that is much easier than would be with conventional enlargement and reduction processing.

Figure 8:
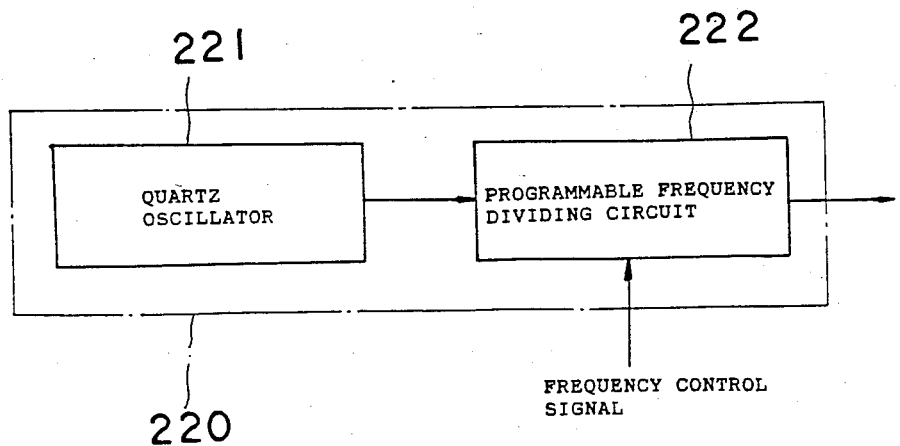
FIG. 8 is a block diagram of a frequency control unit that effects variable control of the frequency of information signals.

There now follows a description of a means for changing the image signal frequency in order to change the dot density in the principal scanning direction. FIG. 8 is a block diagram of an image signal frequency controller 220 which consists of a quartz oscillator 221 and a programmable frequency dividing circuit 222. The division ratio for programmable frequency dividing circuit 222 is set by frequency control signals. Horizontal synchronization may be effected by inputting horizontal synchronization signals as set input for the programmable frequency dividing circuit 222.

Thus, it is possible to set the division ratio in programmable frequency dividing circuit 222 to set values by means of frequency control signals and to vary the image signal frequency. The dot density in the laser beam's principal scanning direction can be made large by making the image signal frequency high and be made small by making the image signal frequency low, and it is therefore made possible to effect variation of resolution in the principal scanning direction. The variation of the dot density in the principal scanning direction also makes it possible to vary the magnification of the image (the magnification relating to the principal scanning direction) with control that is much easier than would be possible with conventional enlargement and reduction processing.

Figure 9:
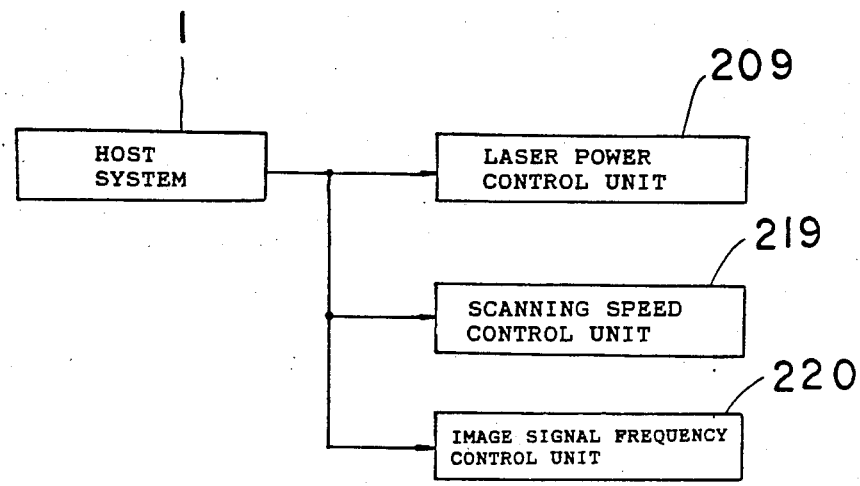
FIG. 9 is a block diagram showing the relations between the control units of FIGS. 6-8 and a host system.

As described above, the laser beam dot diameter can be varied through control by laser power control unit 209. The dot density in the laser beam's subsidiary scanning direction can be varied by control of scanning speed control unit 219. The dot density in the laser beam's principal scanning direction can be varied by control of image signal frequency control unit 220. Possible systems for controlling laser power control unit 209, scanning speed control unit 219 and image frequency control unit 220 are the two systems shown in FIG. 9 and in FIG. 10. FIG. 9 shows a system in which units 209, 219 and 220 are controlled by host system 1, i.e., it is a system in which dot diameter control signals, scanning speed control signals and frequency control signals are output by host system 1.

Figure 10:
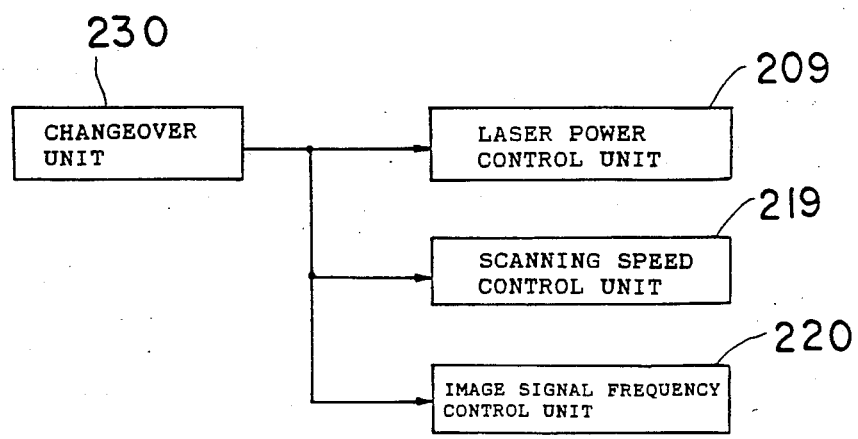
FIG. 10 is a drawing showing the relations between the control units of FIGS. 6-8 and a changeover unit.

FIG. 10 is a system in which variable control of dot diameter, scanning speed and image signal frequency is effected by means of a changeover means 230 constituted by dipswitches, etc. incorporated in the laser printer. Changeover control by changeover means 230 is advantageous when the laser printer is not connected to host system 1 but itself possesses an original document reading apparatus.

If scanning speed control and image signal frequency control are effected together with dot diameter control when the resolution is varied, it is possible to vary the dot density in both the principal and subsidiary scanning directions and also to effect variation of the dot diameter in correspondence to this. This constitutes the most preferable method, but if required it is possible to vary the resolution by effecting independent adjustment of only the dot diameter in the principal scanning direction or only the dot diameter in the subsidiary scanning direction. This control contributes to variation of resolution when equal magnification images are outputed and it is also of advantage that variations in the dot density in the principal and subsidiary scanning directions make it possible to change the transverse or lenghways magnification of images.

Figure 11:
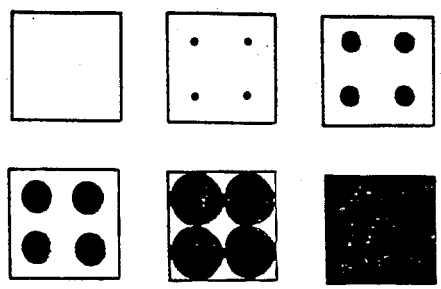
FIG. 11 is a schematic view showing examples of a tone display in which the number of dots and the diameter of dots are varied.

Toning achieved by means of the abovedescribed dot diameter control will now be described with reference to FIGS. 11 and 12. FIG. 11 shows an example of a multi-value area tone display in which the dot diameter of each dot inside a picture element is changed. This control can be effected by laser power control unit 209. Stepwise changes in the size of the dot diameter in this way make finer toning possible and makes it possible to output attractive, natural images even in the case of pictures, patterns or photographs, etc.

Figure 12:
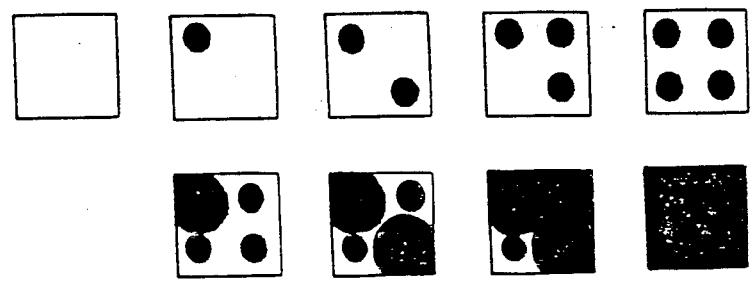
FIG. 12 is a schematic view showing examples of a tone display in which the diameters of a plurality of dots are varied.

FIG. 12 is an example of a tone display in which dot diameter control is effected in a conventional two-value area tone display. A "two-value area tone display" is a display in which toning is effected by varying the number of dots in a picture element, as shown in the upper row in FIG. 12. Adding dot diameter control to this increases the degree of toning and, like the case shown in FIG. 11, makes it possible to form attractive, natural images even in the case of pictures, patterns and photographs, etc. The tone display shown in FIG. 12 is achieved by varying the number of dots and varying the diameter of each dot inside a picture element. This control also can be effected by laser power control unit 209.

The invention is not limited to the abovedescribed embodiment but it is possible to practise a variety of modifications within the scope of the invention.

What is claimed as new and desired to be secured by Letters Patent of the United States is:

1. Light beam scanning apparatus in which light beams are modulated with image information signals and the modulated light beams are radiated onto a photosensitive body comprising:
    a light source for producing light beams;
    a first scanning means comprising a rotating mirror for causing the light beams produced by said light source to effect scanning at a first speed and in a first direction with respect to a photosensitive body;
    a second scanning means for causing the light beams produced by said light source to effect scanning at a second speed and in a second direction which is perpendicular to said first direction;
    an image formation means for forming an image constituted by continuous or discontinuous dots on said photosensitive body after scanning in said first and second directions; and
    a speed control means for controlling the speed of the rotation of said rotating mirror and the light beam scanning in said first direction caused by said first scanning means in a manner such that the density of dots successively formed in said second direction is variable.

2. Light beam scanning apparatus as in claim 1, wherein said speed control means comprises:
    a phase-locked loop circuit connected to said motor in a manner such as to make the reference frequency of said motor variable and for control of the speed of said motor.

3. Light beam scanning apparatus as in claim 2, wherein said speed control means comprises:
    a reference frequency circuit connected to said phase-locked loop which comprises a quartz oscillator and a programmable frequency dividing circuit which effects frequency division of the oscillation output of said quartz oscillator, said motor's reference frequency being changed by changing of the frequency division ratio of said programmable frequency division circuit.

4. Light beam scanning apparatus as in claim 1, further comprising:
    a frequency control means for variable controlling the frequency of image information signals modulating said light beams is effected in a manner such that the density of dots successively formed in said first direction becomes variable wherein said frequency control means comprises:
    a quartz oscillator; and
    a programmable frequency dividing circuit which effects frequency division of the oscillation output of said quartz oscillator and whose frequency division ration is variably controlled.

5. Light beam scanning apparatus in which light beams are modulated with image information signals and the modulated light beams are radiated onto a photosensitive body comprising:
    a light source for producing light beams in which the light energy distribution displays a normal distribution;
    a first scanning means comprising a rotating mirror for causing the light beams produced by said light source to effect scanning at a first speed and in a first direction with respect to a photosensitive body;
    a second scanning means for causing the light beams produced by said light source to effect scanning at a second speed and in a second direction which is perpendicular to said first direction;
    an image formation means for forming developed image constituted by continuous or discontinuous dots on said photosensitive body after scanning in said first and second directions;
    a light source lighting control means connected to said light source for lighting said light source and for changing the diameter of the light beam dot should be developed on said photosensitive body by changing said normal distribution;
    a speed control means for controlling the speed of the rotation of said rotating mirror and the light beam scanning in said first direction caused by said first scanning means in a manner such that the density of dots successively formed in said second direction is variable; and
    a frequency control means for variable controlling the frequency of image information signals modulating said light beams is effected in a manner such that the density of dots successively formed in said first direction becomes variable.

* * * * *